United States Patent
Gariglio

(10) Patent No.: US 6,557,689 B2
(45) Date of Patent: May 6, 2003

(54) ASSEMBLY FOR SUPPORTING AND RETAINING GLASS SHEETS

(75) Inventor: Davide Gariglio, Piossasco (IT)

(73) Assignee: Forvet S.r.l., Bruino (IT)

( * ) Notice: Subject to any disclaimer, the term of this patent is extended or adjusted under 35 U.S.C. 154(b) by 0 days.

(21) Appl. No.: 09/894,441

(22) Filed: Jun. 28, 2001

(65) Prior Publication Data

US 2002/0046919 A1 Apr. 25, 2002

(30) Foreign Application Priority Data

Jun. 30, 2000 (IT) ........................... TO00A0663

(51) Int. Cl.⁷ .................................. B65G 35/00
(52) U.S. Cl. ........................ 198/345.1; 198/434
(58) Field of Search .................. 198/345.1, 434

(56) References Cited

U.S. PATENT DOCUMENTS

| | | | | |
|---|---|---|---|---|
| 3,638,564 A | * | 2/1972 | Prange et al. ............... | 101/35 |
| 3,934,375 A | * | 1/1976 | Hornstein ................. | 51/101 R |
| 3,944,461 A | * | 3/1976 | Ogron ....................... | 156/538 |
| 3,992,182 A | * | 11/1976 | Frank ......................... | 65/163 |
| 4,401,204 A | * | 8/1983 | Roseman et al. ............. | 198/431 |
| 4,420,361 A | * | 12/1983 | Valimont et al. ............ | 156/556 |
| 4,452,351 A | * | 6/1984 | Meeker ....................... | 198/434 |
| 4,493,412 A | * | 1/1985 | Krehnovi .................... | 198/434 |
| 4,787,178 A | * | 11/1988 | Morgan et al. ............... | 51/418 |
| 4,976,766 A | * | 12/1990 | Kuster et al. ................ | 65/289 |
| 5,028,202 A | * | 7/1991 | Katada et al. ............. | 414/783 |
| 5,094,282 A | * | 3/1992 | Suzuki et al. ............... | 144/356 |
| 5,173,029 A | * | 12/1992 | Delventhal et al. ......... | 414/754 |
| 5,411,128 A | * | 5/1995 | Vild et al. ............... | 198/345.1 |
| 5,413,204 A | * | 5/1995 | Mori et al. .............. | 198/345.1 |
| 5,927,469 A | * | 7/1999 | Dunifon et al. ............. | 198/456 |

FOREIGN PATENT DOCUMENTS

| | | | | |
|---|---|---|---|---|
| EP | 0507033 A1 | * | 4/1991 | ............ B23Q/1/02 |
| EP | 0507033 A1 | | 10/1992 | |
| EP | 1090718 A2 | * | 10/1999 | ........... B25B/11/00 |
| EP | 1090718 A2 | | 4/2001 | |

* cited by examiner

*Primary Examiner*—Joseph E. Valenza
*Assistant Examiner*—Rashmi Sharma
(74) *Attorney, Agent, or Firm*—David A. Farah; Sheldon & Mak PC

(57) ABSTRACT

Assembly for supporting and retaining sheets of glass, particularly in a machine for machining the sheets of glass; the assembly possesses a support structure, a plurality of suckers carried by the support structure to hold the sheet of glass in an unambiguous reference position on a horizontal plane and, for each sucker, a corresponding actuator for vertically displacing the suckers between a raised position and a lowered position.

28 Claims, 2 Drawing Sheets

ASSEMBLY FOR SUPPORTING AND RETAINING GLASS SHEETS

CROSS-REFERENCE TO RELATED APPLICATION

This application claims priority from Italian Patent Application TO2000A 000663 titled "Metodo e Macchina di Molatura per la Lavorazione di Lastre di Vetro," filed Jun. 30, 2000; the contents of which is incorporated by reference herein in its entirety.

BACKGROUND

In machines for machining sheets of glass, particularly in grinding machines, it is known practice to hold the sheets of glass in an unambiguous reference position during machining using a retention assembly comprising a plurality of sucker bodies which are arranged manually on a support surface defined by the machine base, their positions being modified whenever required as a function of the dimensions and type of the glass sheets to be machined.

Retention assemblies of the known type described above are not very satisfactory when it is necessary to machine a succession of sheets of glass whose dimensions differ from each other, not only because it takes a relatively long time to arrange the sucker bodies manually each time in the appropriate positions, but more importantly because of the obvious need to ensure that the machining tools do not interfere with the base or with the members used to support, position and retain the sheets of glass, independently of the dimensions and shape of the sheets.

SUMMARY

It is an object of the present invention to provide an assembly for supporting and retaining sheets of glass, particularly in a machine for machining the sheets of glass, by which the problems described above can be solved in a simple and economical manner.

The present invention provides an assembly for supporting and retaining sheets of glass, particularly in a machine for machining the sheets of glass. The assembly comprises a support structure and retention means carried by the support structure to keep the sheet of glass in an unambiguous reference position with respect to the support structure on a plane. The assembly also comprises actuator means for displacing the retention means between a raised position and a lowered position perpendicularly to the plane.

FIGURES

Figure 1:
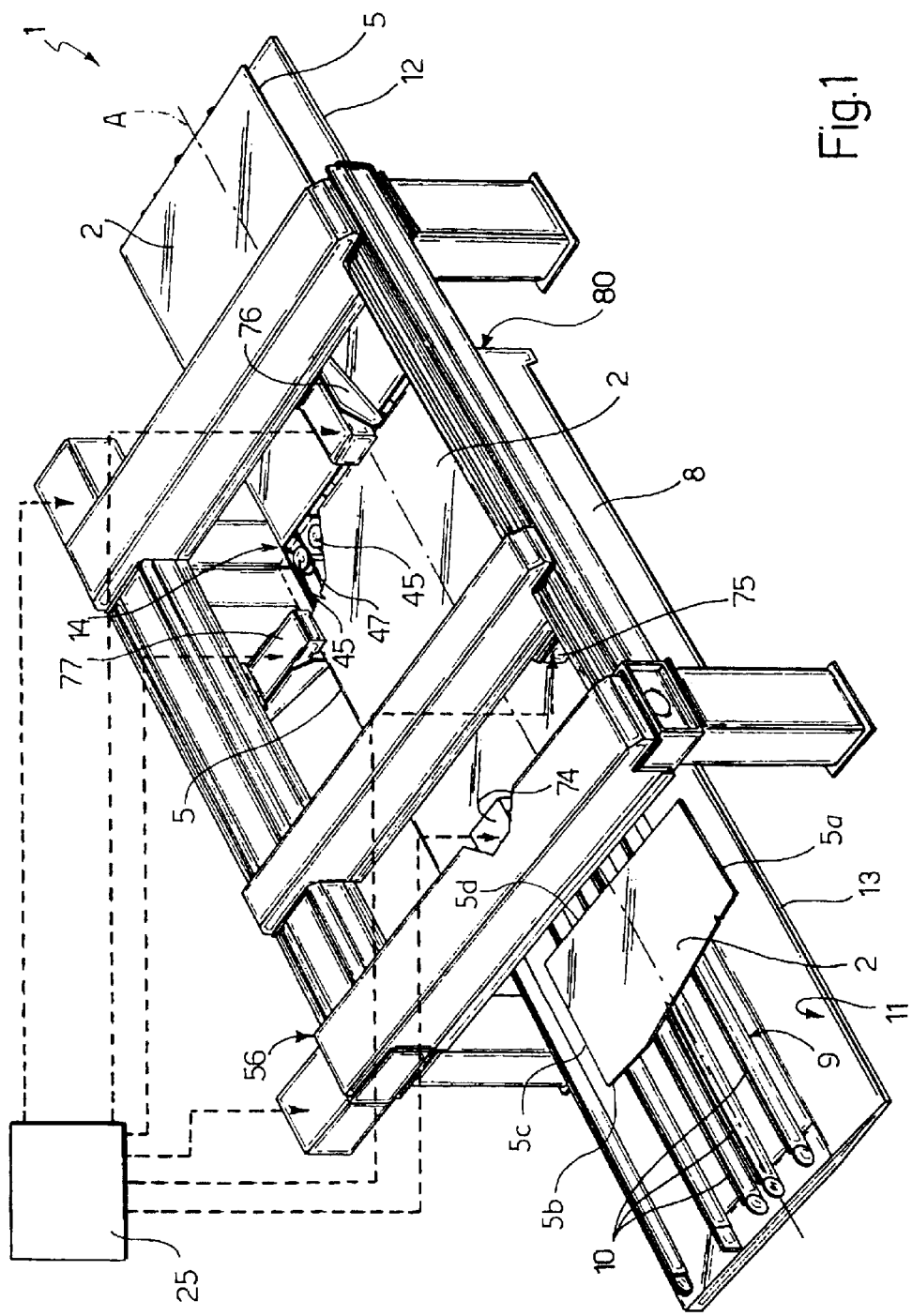
Figure 2:
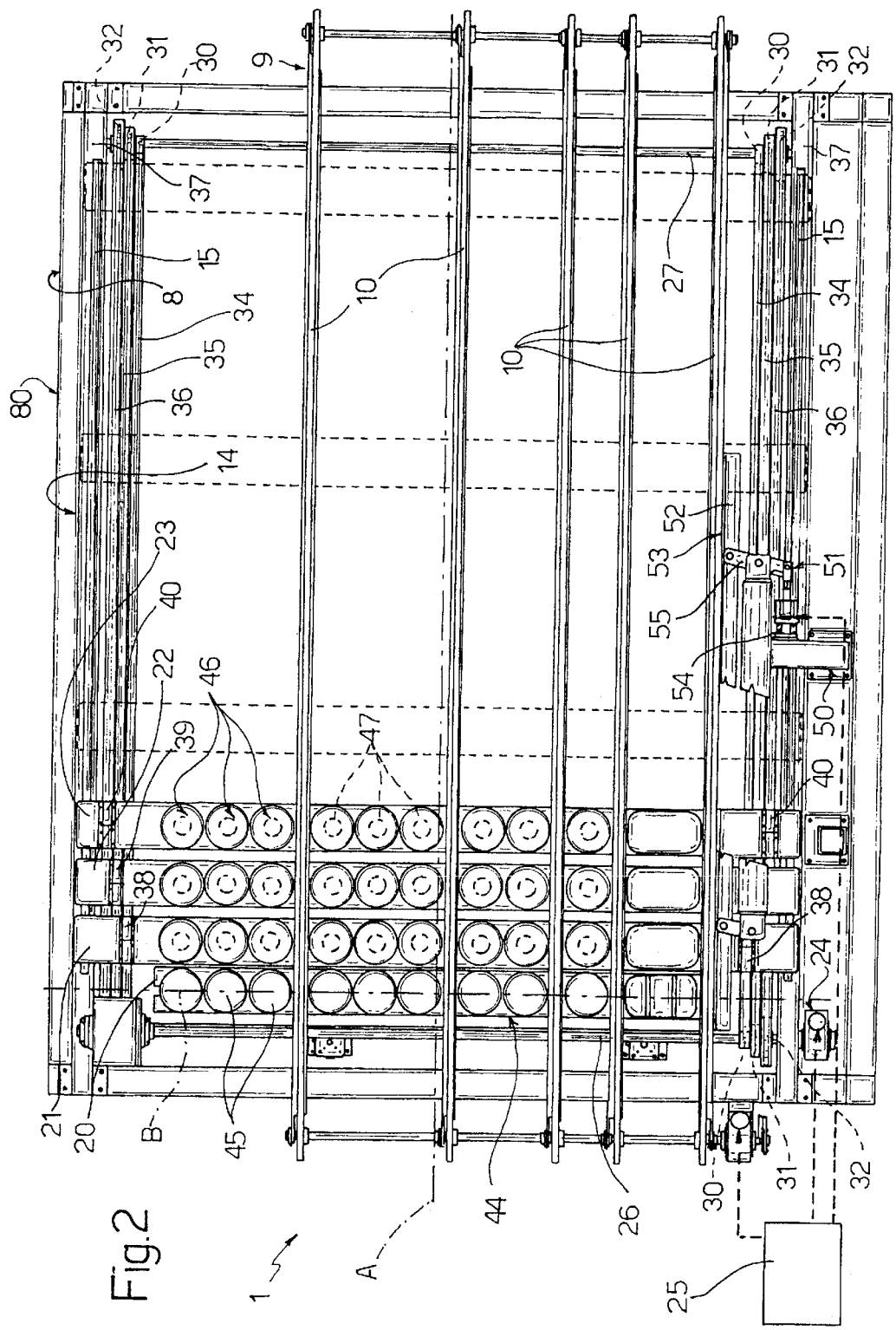

These and other features, aspects and advantages of the present invention will become better understood with regard to the following description, appended claims, and accompanying figures where:

FIG. 1 illustrates in perspective and schematically a preferred embodiment of the assembly for supporting and retaining sheets of glass, particularly in a machine for machining the sheets of glass, produced in accordance with the present invention; and FIG. 2 is a plan view, with parts removed for the sake of clarity, of a detail of the supporting and retaining assembly shown in FIG. 1.

DESCRIPTION

In FIG. 1, 1 indicates a grinding machine for machining sheets 2 of glass (partially illustrated), comprising respective rectangular perimeter edges 5 to be ground, which have dimensions which can optionally be different from one another.

The machine 1 comprises a base 8, which supports a conveyor unit 9, which, in particular, comprises a plurality of drive belts 10, in order to transfer the sheets 2 in succession one after another, along a horizontal plane 11, in a longitudinal horizontal straight direction A, from a loading station 12, towards an unloading station 13, through a work station 14.

With reference to FIG. 2, the station 14 contains two straight longitudinal guides 15, which are disposed on opposite sides relative to the direction A, and are integral with the base 8, and four beams 20, 21, 22, 23, which extend in a horizontal direction B, which is at right-angles to the direction A, in positions which are adjacent to one another. The beam 20 is connected integrally to the base 8, in a position adjacent to the station 13, whereas the beams 21, 22, 23 are connected to the guides 15, such as to slide in the direction A, between the beam 20 and the station 12, and are actuated by a movement unit 24, which is controlled by an electronic command and control unit 25 (illustrated schematically).

The unit 24 comprises a motorized shaft 26 and an idle shaft 27, each of which can rotate around its own axis, parallel to the direction B, and at its ends supports two sets of three wheels 30, 31, 32, which are keyed in fixed positions, coaxially relative to one another, on the corresponding shaft 26, 27, and have respective radii which increase from the wheel 30 to the wheel 32, in order to define ratios of transmission which are different from one another. The unit 24 also includes two sets of three belts 34, 35, 36, which extend in the lateral portions 37 of the base 8, are each wound around a pair of wheels 30, 31, 32, and comprise respective sections 38, 39, 40, which are each connected integrally to the corresponding beam 21, 22, 23.

Each of the beams 20, 21, 23, 23 supports a row of suckers 45, which have an upper surface 46 to support the sheet 2 to be ground, constitute part of a retention unit 44, which is controlled by the unit 25, in order to retain the sheet 2 itself on the surface 46 during grinding, and are connected to a suction pump (not illustrated) by means of respective pneumatic control valves (not illustrated). Each sucker 45 supports a lower rod, which is connected to a pneumatic cylinder, which is integral with the corresponding beam 20, 21, 22, 23, and defines together with the corresponding rod an actuator 47 (illustrated schematically), which is controlled by the unit 25, in order to displace the suckers 45 between a raised position, in which the sheet 2 is disposed in a position spaced from the belts 10 in order to be ground, and a lowered rest position, in which the sheet 2 is disposed on the belts 10, in order to be transferred from and to the station 14 on the plane 11.

The station 14 accommodates a positioning unit 50, which is controlled by the unit 25, in order to dispose each sheet 2 to be processed in a reference position on the plane 11, relative to the base 8, and comprises a retractable reference stop (not illustrated) of a known type, which is supported by the base 8, and an alignment device 51, which is supported by the lateral portion 37. In particular, the device 51 comprises a thrust unit 52, which is delimited by a surface 53, parallel to the direction A, and is actuated by an actuator 54, by means of interposition of a four-bar chain lever system 55, in order to displace the surface 53 parallel to itself in the direction B, against one side 5b of the sheet 2, thus aligning the side 5b itself in the direction A.

As illustrated in FIG. 1, the station 14 contains a frame 56, which supports four grinding heads 74, 75, 76, 77.

The grinding heads 74, 75, 76, 77 are actuated by respective motors (not illustrated), which are independent from one another, are accommodated in the frame 56, and are controlled by the unit 25, in order to displace the heads 74, 75, 76, 77 themselves simultaneously along respective transverse paths which are incident relative to one another, defined by respective guides, such as to grind respective sides 5a, 5b, 5c, 5d of the edge 5, which are transverse relative to one another, and consecutive.

In use, the sheets 2 are loaded one after another on the station 12, by setting on the unit 25 the parameters relative to the perimeter dimensions to be obtained for the sheets 2 to be processed. The parameters can be set manually for each of the sheets 2, or they can be entered together with the number of consecutive sheets 2 which have the same dimensions, or they can be taken from a data base which is stored and resident in the unit 25, or in a remote computer (not illustrated), which is connected to the unit 25 itself. It is understood that the machine 1 comprises sensors (not illustrated), which allow the unit 25 to detect the type of sheet 2 present on the station 14, and check the accuracy of the parameters set.

During transfer of the sheet 2 to be processed, towards the station 14, the unit 25 controls actuation of the shaft 26, in order to make the belts 34, 35, 36 run at different linear speeds from one another, and such as to move the beams 21, 22, 23 apart from one another progressively, on the basis of the dimensions of the sheet 2, keeping the beams 20, 21, 22, 23 equally spaced.

When the sheet 2 reaches the station 14, the unit 25 firstly controls the unit 50, in order to position the sheet 2 in an unambiguous reference position, and then the unit 44, in order to actuate only the suckers 45 covered by the sheet 2. Subsequently, the unit 25 actuates the actuators 47 associated with the suckers 45 which are retaining the sheet 2, such as to bring the sheet 2 itself into the raised machining position.

While these operations are being carried out on the sheet 2, the unit 25 commands positioning of the head 75, 74, 76, 77 with respect to the base 8 in respective corresponding points for commencement of machining, each at a vertex of the edge 5, in order to adapt the grinding cycle to the dimensions of the sheet 2. Simultaneously, the configuration of the grinding wheels of each head 74, 75, 76, 77 is regulated by the unit 25, on the basis of the thickness of the sheet of glass 2 to be ground.

During the grinding operations, the heads 74, 75, 76, 77 are displaced in an unambiguous direction of travel or advance of the edge 5, following one another without interfering with one another. The point or vertex of completion of machining of each head 74, 75, 76, 77 coincides with the point or vertex of commencement of machining of the following side 5a, 5b, 5c, 5d. When the grinding has been completed, the actuators 47 are controlled such as to take the suckers 45 into their lowered position, and the suckers 45 themselves are deactivated in order to release the sheet 2, which is then transferred towards the station 13. The subsequent sheet 2 is already on the station 14, in particular in the case in which the sheet 2 which is being processed is smaller than the station 14 itself, and is transferred such as to initiate a new cycle on the basis of the parameters entered in the unit 25.

It will be clear from the above that the base 8, the suckers 45, the actuators 47 and the units 24, 25 and 50 are part of a supporting and retaining assembly 80 that is extremely flexible since it is capable of holding sheets 2 of dissimilar dimensions firmly and precisely and machining the sheets 2 without difficulties, independently of their dimensions.

This is due to the fact that the raising, by the suckers 45, of the sheet 2 to be ground prevents interference of the heads 74, 75, 76, 77 against the base 8 and with any suckers 45, or with other devices for positioning the sheets 2, which are positioned outside of the projection of the edge 5 onto the plane 11.

Moreover, the unit 24 makes it possible to adapt the position of the suckers 45, and to render stable the positioning and retention of sheets 2 which have dimensions different from Moreover, the unit 24 makes it possible to adapt the position of the suckers 45, and to render stable the positioning and retention of sheets 2 which have dimensions different from one another.

Lastly, owing to the features of its construction, the assembly 80 is extremely simple and compact.

Finally, it is apparent from the foregoing that modifications and variants can be made to the assembly 80 described, which do not depart from the field of protection of the present invention.

In particular, the units 24 and 50 could be different from those illustrated and described, and the assembly 80 could be used in a glass-sheet machining machine different from the machine 1 described and illustrated by way of example.

Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A machine for machining sheets of glass comprising:
   a) a base comprising a conveyor unit for transferring the sheets in succession one after another along a horizontal plane in a direction A from a loading station through a work station, where the work station comprises at least one grinder connected to the base for grinding at least one edge of the sheets of glass;
   b) a first beam, a second beam and a third beam, each beam extending in a horizontal direction B perpendicular to the direction A, where each beam is connected to the base, and where the second beam and the third beam are movable with respect to the first beam in the direction A and opposite to the direction A;
   c) a movement unit connected to the second beam and the third beam for moving the second beam and the third beam toward or away from the first beam in the direction A and opposite to the direction A, respectively; and
   d) a plurality of suckers attached to each beam for reversibly retaining a sheet of glass in the work station;
   where the movement unit moves the second beam and the third beam simultaneously in the direction A or opposite to the direction A at different speeds from one another, such that the distance between the first beam and the second beam is maintained equal to the distance between the second beam and the third beam.

2. The machine of claim 1, further comprising a fourth beam between the second beam and the third beam extending in a horizontal direction B perpendicular to the direction A, the fourth beam connected to the base, and movable with respect to the first beam in the direction A and opposite to the direction A;

where the movement unit moves the second beam, the third beam and the fourth beam simultaneously in the direction A or opposite to the direction A at different speeds from one another such that the distance between the first beam and the second beam is maintained equal to the distance between the second beam and the fourth beam and is maintained equal to the distance between the third beam and the fourth beam.

3. The machine of claim 1, further comprising a plurality of additional beams between the second beam and the third beam, each additional beam extending in a horizontal direction B perpendicular to the direction A, each additional beam connected to the base, and each additional beam movable with respect to the first beam in the direction A and opposite to the direction A;

where the movement unit moves the second beam, the third beam and each additional beam simultaneously in the direction A or opposite to the direction A at different speeds from one another such that the distance between each beam is maintained equal to the distance between the next adjacent beam.

4. The machine of claim 1, further comprising two longitudinal guides integral with the base and disposed on opposite sides relative to the direction A, where each beam is connected to each guide.

5. The machine of claim 1, further comprising a suction pump functionally connected to each sucker for activating and deactivating each sucker for reversibly retaining a sheet of glass in the work station.

6. The machine of claim 1, further comprising means for raising and lowering each beam with respect to the horizontal plane.

7. The machine of claim 1, where the at least one grinder is four grinders.

8. A machine for machining sheets of glass comprising:

a) a base comprising means for transferring the sheets in succession one after another along a horizontal plane in a direction A from a loading station through a work station, where the work station comprises at least one grinder connected to the base for grinding at least one edge of the sheets of glass;

b) a first retention means, a second retention means and a third retention means, each retention means extending in a horizontal direction B perpendicular to the direction A, where each retention means is connected to the base, and where the second retention means and the third retention means are movable with respect to the first retention means in the direction A and opposite to the direction A; and c) means for moving the second retention means and the third retention means connected to the second retention means and the third retention means for moving the second retention means and the third retention means toward or away from the first retention means in the direction A and opposite to the direction A, respectively;

where the means for moving moves the second retention means and the third retention means simultaneously in the direction A or opposite to the direction A at different speeds from one another, such that the distance between the first retention means and the second retention means is maintained equal to the distance between the second retention means and the third retention means.

9. The machine of claim 8, further comprising a fourth retention means between the second retention means and the third retention means extending in a horizontal direction B perpendicular to the direction A, the fourth retention means connected to the base, and movable with respect to the first retention means in the direction A and opposite to the direction A;

where the means for moving moves the second retention means, the third retention means and the fourth retention means simultaneously in the direction A or opposite to the direction A at different speeds from one another such that the distance between the first retention means and the second retention means is maintained equal to the distance between the second retention means and the fourth retention means and is maintained equal to the distance between the third retention means and the fourth retention means.

10. The machine of claim 8, further comprising a plurality of additional retention means between the second retention means and the third retention means, each additional retention means extending in a horizontal direction B perpendicular to the direction A, each additional retention means connected to the base, and each additional retention means movable with respect to the first retention means in the direction A and opposite to the direction A;

where the means for moving moves the second retention means, the third retention means and each additional retention means simultaneously in the direction A or opposite to the direction A at different speeds from one another such that the distance between each retention means is maintained equal to the distance between the next adjacent retention means.

11. The machine of claim 8, further comprising two means for guiding integral with the base and disposed on opposite sides relative to the direction A, where each retention means is connected to each means for guiding.

12. The machine of claim 8, further comprising a means for creating suction functionally connected to each retention means for activating and deactivating each retention means for reversibly retaining a sheet of glass in the work station.

13. The machine of claim 8, further comprising means for raising and lowering each retention means with respect to the horizontal plane.

14. The machine of claim 8, where the at least one grinder is four grinders.

15. A method of machining a first sheet of glass having a shape and dimensions comprising:

a) providing a machine for machining sheets of glass according to claim 10;

b) activating the movement unit in a manner specific for the shape and dimensions of the first sheet of glass, thereby moving the second beam and the third beam simultaneously in the direction A or opposite to the direction A at different speeds from one another, such that the distance between the first beam and the second beam is maintained equal to the distance between the second beam and the third beam;

c) conveying the first sheet of glass onto the first beam, the second beam and the third beam;

d) activating the suckers to retain the first sheet of glass;

e) activating the at least one grinder, thereby grinding at least one edge of the first sheet of glass;

f) deactivating the at least one grinder, thereby ceasing the grinding of the at least one edge of the first sheet of glass;

g) deactivating the suckers from the first sheet of glass; and h) removing the first sheet of glass from the machine.

16. The method of claim 15, where the machine further comprises a fourth beam between the second beam and the third beam extending in a horizontal direction B perpendicular to the direction A, the fourth beam connected to the base, and movable with respect to the first beam in the direction A and opposite to the direction A;

where the movement unit moves the second beam, the third beam and the fourth beam simultaneously in the direction A or opposite to the direction A at different speeds from one another such that the distance between the first beam and the second beam is maintained equal to the distance between the second beam and the fourth beam and is maintained equal to the distance between the third beam and the fourth beam; and where activating the movement unit moves the second beam, the third beam and the fourth beam simultaneously in the direction A or opposite to the direction A at different speeds from one another, such that the distance between the first beam and the second beam is maintained equal to the distance between the second beam and the fourth beam, and is maintained equal to the distance between the third beam and the fourth beam.

17. The method of claim 15, where the machine further comprises a plurality of additional beams between the second beam and the third beam extending in a horizontal direction B perpendicular to the direction A, each additional beam connected to the base, and movable with respect to the first beam in the direction A and opposite to the direction A;

where the movement unit moves the second beam, the third beam and each additional beam simultaneously in the direction A or opposite to the direction A at different speeds from one another such that the distance between each beam is maintained equal to the distance between the next adjacent beam; and where activating the movement unit moves the second beam, the third beam and each additional beam simultaneously in the direction A or opposite to the direction A at different speeds from one another, such that the distance between each beam is maintained equal to the distance between the next adjacent beam.

18. The method of claim 15, additionally comprising machining a second sheet of glass having a shape and dimensions comprising i) activating the movement unit in a manner specific for the shape and dimensions of the second sheet of glass, thereby moving the second beam and the third beam simultaneously in the direction A or opposite to the direction A at different speeds from one another, such that the distance between the first beam and the second beam is maintained equal to the distance between the second beam and the third beam;

j) conveying the second sheet of glass onto the first beam, the second beam and the third beam;

k) activating the suckers to retain the second sheet of glass;

l) activating the at least one grinder, thereby grinding at least one edge of the second sheet of glass;

m) deactivating the at least one grinder, thereby ceasing the grinding of the at least one edge of the second sheet of glass;

n) deactivating the suckers from the second sheet of glass; and o) removing the second sheet of glass from the machine.

19. The method of claim 18, where the machine further comprises a fourth beam between the second beam and the third beam extending in a horizontal direction B perpendicular to the direction A, the fourth beam connected to the base, and movable with respect to the first beam in the direction A and opposite to the direction A;

where the movement unit moves the second beam, the third beam and the fourth beam simultaneously in the direction A or opposite to the direction A at different speeds from one another such that the distance between the first beam and the second beam is maintained equal to the distance between the second beam and the fourth beam and is maintained equal to the distance between the third beam and the fourth beam; and where activating the movement unit moves the second beam, the third beam and the fourth beam simultaneously in the direction A or opposite to the direction A at different speeds from one another, such that the distance between the first beam and the second beam is maintained equal to the distance between the second beam and the fourth beam, and is maintained equal to the distance between the third beam and the fourth beam.

20. The method of claim 18, where the machine further comprises a plurality of additional beams between the second beam and the third beam extending in a horizontal direction B perpendicular to the direction A, each additional beam connected to the base, and movable with respect to the first beam in the direction A and opposite to the direction A;

where the movement unit moves the second beam, the third beam and each additional beam simultaneously in the direction A or opposite to the direction A at different speeds from one another such that the distance between each beam is maintained equal to the distance between the next adjacent beam; and where activating the movement unit moves the second beam, the third beam and each additional beam simultaneously in the direction A or opposite to the direction A at different speeds from one another, such that the distance between each beam is maintained equal to the distance between the next adjacent beam.

21. The method of claim 18, where the first sheet of glass and the second sheet of glass have a shape or dimensions different from one another.

22. A method of machining a first sheet of glass having a shape and dimensions comprising:

a) providing a machine for machining sheets of glass according to claim 17;

b) activating the means for moving in a manner specific for the shape and dimensions of the first sheet of glass, thereby moving the second retention means and the third retention means simultaneously in the direction A or opposite to the direction A at different speeds from one another, such that the distance between the first retention means and the second retention means is maintained equal to the distance between the second retention means and the third retention means;

c) conveying the first sheet of glass onto the first retention means, the second retention means and the third retention means;

d) activating the retention means to retain the first sheet of glass;

e) activating the at least one grinder, thereby grinding at least one edge of the first sheet of glass;

f) deactivating the at least one grinder, thereby ceasing the grinding of the at least one edge of the first sheet of glass;

g) deactivating the retention means from the first sheet of glass; and h) removing the first sheet of glass from the machine.

23. The method of claim 22, where the machine further comprises a fourth retention means between the second retention means and the third retention means extending in a horizontal direction B perpendicular to the direction A, the fourth retention means connected to the base, and movable with respect to the first retention means in the direction A and opposite to the direction A;

where the means for moving moves the second retention means, the third retention means and the fourth retention means simultaneously in the direction A or opposite to the direction A at different speeds from one another such that the distance between the first retention means and the second retention means is maintained equal to the distance between the second retention means and the fourth retention means and is maintained equal to the distance between the third retention means and the fourth retention means; and where activating the means for moving moves the second retention means, the third retention means and the fourth retention means simultaneously in the direction A or opposite to the direction A at different speeds from one another, such that the distance between the first retention means and the second retention means is maintained equal to the distance between the second retention means and the fourth retention means, and is maintained equal to the distance between the third retention means and the fourth retention means.

24. The method of claim 22, where the machine further comprises a plurality of additional retention means between the second retention means and the third retention means extending in a horizontal direction B perpendicular to the direction A, each additional retention means connected to the base, and movable with respect to the first retention means in the direction A and opposite to the direction A;

where the means for moving moves the second retention means, the third retention means and each additional retention means simultaneously in the direction A or opposite to the direction A at different speeds from one another such that the distance between each retention means is maintained equal to the distance between the next adjacent retention means; and where activating the means for moving moves the second retention means, the third retention means and each additional retention means simultaneously in the direction A or opposite to the direction A at different speeds from one another, such that the distance between each retention means is maintained equal to the distance between the next adjacent retention means.

25. The method of claim 22, additionally comprising machining a second sheet of glass having a shape and dimensions comprising i) activating the means for moving in a manner specific for the shape and dimensions of the second sheet of glass, thereby moving the second retention means and the third retention means simultaneously in the direction A or opposite to the direction A at different speeds from one another, such that the distance between the first retention means and the second retention means is maintained equal to the distance between the second retention means and the third retention means;

j) conveying the second sheet of glass onto the first retention means, the second retention means and the third retention means;

k) activating the retention means to retain the second sheet of glass;

l) activating the at least one grinder, thereby grinding at least one edge of the second sheet of glass;

m) deactivating the at least one grinder, thereby ceasing the grinding of the at least one edge of the second sheet of glass;

n) deactivating the retention means from the second sheet of glass; and o) removing the second sheet of glass from the machine.

26. The method of claim 25, where the machine further comprises a fourth retention means between the second retention means and the third retention means extending in a horizontal direction B perpendicular to the direction A, the fourth retention means connected to the base, and movable with respect to the first retention means in the direction A and opposite to the direction A;

where the means for moving moves the second retention means, the third retention means and the fourth retention means simultaneously in the direction A or opposite to the direction A at different speeds from one another such that the distance between the first retention means and the second retention means is maintained equal to the distance between the second retention means and the fourth retention means and is maintained equal to the distance between the third retention means and the fourth retention means; and where activating the means for moving moves the second retention means, the third retention means and the fourth retention means simultaneously in the direction A or opposite to the direction A at different speeds from one another, such that the distance between the first retention means and the second retention means is maintained equal to the distance between the second retention means and the fourth retention means, and is maintained equal to the distance between the third retention means and the fourth retention means.

27. The method of claim 25, where the machine further comprises a plurality of additional retention means between the second retention means and the third retention means extending in a horizontal direction B perpendicular to the direction A, each additional retention means connected to the base, and movable with respect to the first retention means in the direction A and opposite to the direction A;

where the means for moving moves the second retention means, the third retention means and each additional retention means simultaneously in the direction A or opposite to the direction A at different speeds from one another such that the distance between each retention means is maintained equal to the distance between the next adjacent retention means; and where activating the means for moving moves the second retention means, the third retention means and each additional retention means simultaneously in the direction A or opposite to the direction A at different speeds from one another, such that the distance between each retention means is maintained equal to the distance between the next adjacent retention means.

28. The method of claim 25, where the first sheet of glass and the second sheet of glass have a shape or dimensions different from one another.

* * * * *